United States Patent [19]
Carnavos

[11] 3,803,001
[45] Apr. 9, 1974

[54] COMBINATION CONDENSER-DEGASSER-DEAERATOR FOR A DESALINATION PLANT

[75] Inventor: Theodore C. Carnavos, Danbury, Conn.

[73] Assignee: General Electric Company

[22] Filed: Mar. 22, 1972

[21] Appl. No.: 237,206

[52] U.S. Cl. .................. 202/176, 202/173, 202/180, 202/185, 202/202, 202/205, 202/236, 203/11, 203/89, 203/90, 55/195

[51] Int. Cl. .............................................. B01d 3/10

[58] Field of Search ........... 202/176, 236, 177, 205, 202/180, 173, 202, 185; 203/11, 90, 89; 55/42, 195, 206, 39

[56] References Cited
UNITED STATES PATENTS

| | | |
|---|---|---|
| 2,689,018 | 9/1954 | Kittredge .............................. 55/39 |
| 3,244,601 | 4/1966 | Diedrich ............................ 202/236 |
| 2,908,618 | 10/1959 | Bethon ................................. 203/11 |
| 3,461,041 | 8/1969 | Snyder ............................... 202/177 |
| 3,218,241 | 11/1965 | Checkovich ......................... 203/11 |
| 3,697,383 | 10/1972 | Weaver .............................. 202/236 |

*Primary Examiner*—Wilbur L. Bascomb, Jr.
*Attorney, Agent, or Firm*—John F. Ahern, James W. Mitchell

[57] ABSTRACT

A multi-purpose device for condensing vapor from the last stage of a thermal-type desalination plant into product water, pretreating feedwater by degassing and deaerating in thin films over vertical fluted heat transfer surfaces, preheating the feedwater supplied to the plant, and removing evolved gases, non-condensibles and uncondensed vapor from the system.

5 Claims, 2 Drawing Figures

3,803,001

COMBINATION CONDENSER-DEGASSER-DEAERATOR FOR A DESALINATION PLANT

BACKGROUND OF THE INVENTION

This invention relates generally to thermal-type desalination plants and more particularly to a multi-purpose device serving to condense the final product and to degas, deaerate, and heat the entering feedwater. In thermal-type desalination plants, it is necessary to provide a means for condensing vapor into a final product called distillate. In single-effect plants, this would be the total product which is condensed; in multiple-effect plants, it would be that portion of the total product produced in the last effect. It is also desirable to return to the system the maximum amount of heat removed so as to minimize the primary energy input at the head end of the plant, thus improving thermal efficiency and is mainly accomplished by using the feed to the plant to condense the product.

Incoming feedwater to the desalting plant is generally degassed and deaerated. Degassing is a more general term and can be accomplished without heating the feedwater in a separate piece of equipment such as a packed tower with counterflow stripping fans, spray ponds, etc. Degassing is referred to herein as a step necessary to remove gases evolved due to the chemical scale control of the feedwater. For example, in the popular-type treatment known as pH control, sulphuric acid is added to the plant feedwater which chemically reacts with the carbonates, decomposing them and in the process evolving carbon dioxide gas. This gas may be removed by simply exposing a large surface of the feedwater as in a spray and/or thin film.

Deaeration is defined as heating of the liquid to a temperature at the appropriate pressure so as to remove gases that are dissolved in the feedwater such as oxygen, nitrogen, carbon dioxide, etc. A deaerator is generally also used in a desalination plant and is a separate piece of equipment.

The foregoing treatments will also reduce corrosion allowing less expensive materials of construction to be used, will inhibit the formation of scales on the heat-transfer surfaces, and will be generally beneficial to the operation of the plant.

Accordingly, one object of the present invention is to provide a multi-purpose condenser-degasser-deaerator and feedwater preheater which accomplishes all of the foregoing functions in a single compact vessel.

Another object of the invention is to provide an improved condenser-deaerator which performs all of these functions by a tube bundle in a single compact vessel.

SUMMARY OF THE INVENTION

Briefly stated, the invention is practiced by employing a vertical tube bundle with nozzle means to spray and then flow thin films of incoming feed on the inside of the tubes while condensing vapor from the plant on the outside of the tubes. A distillate collection tank collects distillate from the plant and from the vapor condensed on the tubes. Deaerated feedwater is heated by the condensed vapor and the distillate in the distillate collection tank enroute to the plant while a vacuum system is connected to withdraw noncondensibles, uncondensed vapor and evolved gases.

DESCRIPTION OF THE PREFERRED EMBODIMENT

Figures 1, 2:
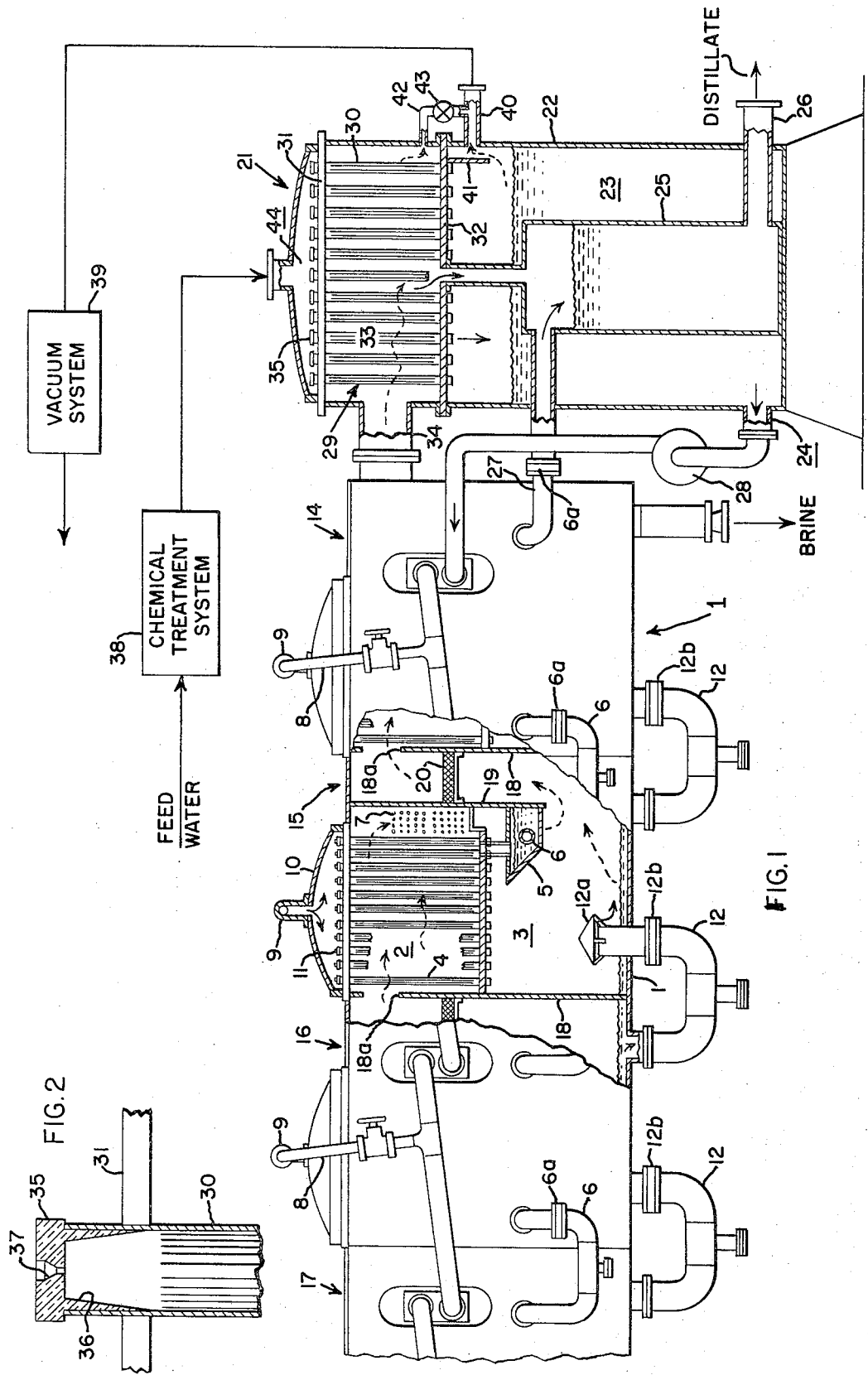
FIG. 1 is a side view of portions of the desalination plant according to the invention.
FIG. 2 is a detailed view of a nozzle forming a portion of the invention.

Referring to FIG. 1 of the drawing, a side view of portions of the desalination plant is shown, partially in section, so as to indicate details typical of one effect of a multiple-effect plant. The various effects are longitudinally spaced along a pressure vessel 1 which is divided into a condensing chamber 2 in the upper half and a brine-vapor separation chamber 3 in the lower half. Vapor condenses on the outer fluted surface of vertical tubes 4 and is conducted by means such as chamber 5 to the side where it is removed through condensate removal pipes 6 to the next lower effect. Pressure seal 6a is provided to prevent blow through and is shown as an orifice but could be a valve or other device.

Feedwater is also heated in the tubes of feedwater heaters 7 by condensing vapor. A controlled flow of feedwater to each effect is supplied through branch lines 8 and through inline strainers 9 to the top of feedwater channels 10. Feedwater in each channel is supplied through individual spray nozzles 11 in a thin film along the inner surface of fluted tubes 4 where it evaporates and the resulting vapor passes into the lower separation chamber 3. Unevaporated brine falls into the bottom of the pressure vessel 1 and is passed to the succeeding effect by brine loops 12.

The plant shown is multi-effect, where a number of successively higher temperature effects are indicated by reference numerals 14, 15, 16 and 17. It will be understood that any number of such effects may be employed which are economically practicable and that the effects are substantially identical in internal construction with the possible exception of sizes and proportions which are adjusted as necessary for varying flow rates.

Referring to the internal details of effect 15 which is shown in cross section, it will be seen that the effects are flow-wise and thermally closely coupled to improve efficiency and reduce costs. This is done by means of simple vertical partition walls 18 separating the effects. Openings 18a permit the passage of vapor from each higher pressure effect to a lower pressure effect, from left to right. The brine loops 12 similarly conduct unevaporated brine toward the right around partition wall 18 while providing a pressure seal 12b to prevent blow through. Caps 12a deflect liquid downwardly preventing disruption of desired flow processes in chamber 3 and improve the efficiency of flashing brine by allowing equilibrium conditions to be more nearly approached.

A downwardly extending baffle plate 19 is spaced from divider wall 18 to form a passage leading toward opening 18a. A moisture separator element 20 in the passage removes any brine droplets from the vapor as it passes into the next lower pressure effect.

The combination condenser-degasser-deaerator, known hereinafter as the CDD, is indicated generally at 21 and comprises a vertical vessel 22 forming a feedwater collection chamber 23 in the lower part thereof with outlet pipe 24. A distillate collection tank 25 is disposed within the vessel so as to be contacted by the feedwater, with an outlet 26 running to the discharge point for the final product from the plant. Distillate enters tank 25 through a pipe 27 leading from the last stage 14 of the desalination plant, while treated and heated feedwater is supplied from pipe 24 by a pump 28 to the first internal feedwater heater 7 in the plant.

Disposed in the upper part of vessel 22 is a tube bundle 29 of vertical tubes which are preferably double-fluted in configuration in accordance with the teachings of U.S. Pat. No. 3,291,704 issued to G. E. Diedrich and C. W. Lotz and assigned to the present assignee. The fluted tubes, indicated at 30, are supported between an upper and lower tube sheet, 31, 32, respectively, which together seal off a vapor collection chamber 33 inside the vessel. A pipe 34 conducting vapor from the last effect 14 of the desalination plant serves to supply the outside fluted surfaces of tubes 30 with vapor to be condensed.

Upper tube sheet 31 serves as the floor of a feedwater supply chamber 44 in the upper part of the vessel. Chamber 44 feeds the insides of tubes 30 by flow through nozzles 35.

The details of nozzles 35 may be seen by reference to FIG. 2 of the drawing. Each nozzle 35 is preferably a porcelain cap with interior sloped walls 36 and a feed port 37. Swirl ports (not shown) cause the feedwater entering at 37 to spread around the walls 37 and exit in a spray and then flow in thin films down the interior fluted surface of tubes 30 by gravity.

Returning to FIG. 1 of the drawing, a chemical treatment system is indicated at 38 through which the incoming feedwater passes enroute to the feedwater supply chamber 44 in the top of the vessel. Typically, sulphuric acid is injected at this point which causes carbon dioxide gas to evolve while chemically reacting with the carbonates in the feedwater.

Finally, a vacuum system 39 is indicated which is usually comprised of ejectors operated by steam from the desalination plant. The vacuum system is connected to a vent 40 above the collected feedwater level and shielded by a baffle plate 41. A supplementary vent line 42 from the vapor chamber 33 is also connected to the vacuum system via a pressure reducing valve 43 or its equivalent, such as an orifice.

OPERATION

The operation of the invention will be made more clear by the following description. In the main part of the desalination plant 1, feedwater travels toward the left in the drawing, being heated by a feedwater heater 7 in each effect and a portion of the feedwater entering the effect through a branch line 8 and strainers 9. Vapor travels toward the right through the successive condensing chambers 2, including feedwater heaters 7, passing through separation chambers 3 and moisture separators 20 to the next effect. Distillate or product water travels to the right in pipes 6 being collected in each effect from condensed vapor. Brine also travels to the right through brine loops 12.

Turning to the feedwater supply from the desalination plant 1, acidified feed from chemical treatment system 38 enters the feedwater supply chamber 44. It is directed to the inside of the vertical fluted tubes 30 in a thin film by means of nozzles 35. At this point, the feedwater is degassed of chemically initiated carbon dioxide and other evolved gases. Some deaeration is also accomplished at the nozzle since this chamber is held at less than atmospheric pressure. The spray nozzles provide a substantial surface area of water via droplets allowing equilibrium conditions to be reached in a small interval of time.

The feedwater is distributed in a thin film on the inside surface of the tubes and as the liquid flows down the surface, it is sensibly heated by vapor condensing on the outside. Additionally a small amount of boiling takes place thus completing the deaeration process. The evolved gas travels down the inside of the tube together with the liquid to the feedwater collection chamber 23. The feedwater is now heated further by being in heat exchange relationship with a distillate collection tank 25 and from there it is supplied by a pump 28 to the main plant. If additional chemical treatment is required, i.e., pH adjustment to basic levels, the necessary chemicals can be added to the feedwater collection chamber 23 before the feedwater flows to the plant.

Turning now to the vapor discharge end of the plant, the final vapor flowing through pipe 34 into vapor chamber 33 condenses on the outside of the tubes 30 and is directed toward the distillate collection tank 25. Tank 25 is also supplied by the main distillate discharge line 27 from the plant.

Chamber 33 will contain some noncondensible gases, the removal of which will enhance the efficiency of the total plant. Also the space above the feedwater in collection tank 23 is exposed to continually evolving gases from the degassing and deaeration phase. These are continually drawn off by the vacuum system 39 via pipes 40, 42 from the respective chambers. Due to the pressure difference, a valve 43 or equivalent is necessary.

Heretofore, the deaeration of the feedwater and the condensing of the vapor from the plant have required slightly different constructions and have been carried out in separate vessels. However, by use of spraying feedwater in thin films on the inside of vertical tubes and the enhanced heat-transfer, particularly available from double-fluted tubes, the above-described construction provides a greatly improved and compact means to accomplish the feedwater pretreatment, plant product and vapor after-treatment in a single combined unit.

While there has been described herein what is considered to be the preferred embodiment of the invention, other modifications will occur to those skilled in the art, and it is desired to secure in the appended claims all such modifications as fall within the true spirit and scope of the invention.

What is claimed is:

1. For use in a desalination plant requiring degassed and/or deaerated feedwater and discharging both distillate and vapor therefrom, a combination degasser and-/or deaerator and condenser comprising:
a vessel having a feedwater collection chamber in the lower part thereof and a feedwater supply chamber in the upper part thereof,
a tube bundle with a plurality of vertical tubes disposed in said vessel, the lower ends of said tubes draining into said feedwater collection chamber,
a distillate collection tank, said distillate collection tank disposed in said feedwater collection chamber so as to be in heat transfer relationship to collected feedwater, nozzle means connected to each of said tubes to spray and distribute feedwater from the feedwater supply chamber in a thin film on the inside of said tubes, whereby the feedwater is degassed and then finally deaerated while flowing down the tubes, first conduit means conducting vapor from the plant over the outside of said tubes, second conduit means conducting condensed vapor from around said tubes into said distillate collection tank, and a vacuum system connected to said vessel and plant to remove noncondensibles and uncondensed vapor.

2. The combination according to claim 1, including third conduit means conducting distillate from the desalination plant into said distillate collection tank.

3. The combination according to claim 1, wherein said vertical tubes are fluted both inside and out and wherein said nozzle means comprises a feed spray nozzle arranged to flow feedwater onto the inside flutes.

4. The combination according to claim 1, wherein said tube bundle includes a pair of spaced tube sheets supporting said vertical tubes and defining a vapor chamber therebetween for receiving vapor for said plant, said upper tube sheet defining a portion of said feedwater supply chamber and said lower tube sheet draining condensed vapor toward said distillate collection tank.

5. The combination according to claim 4, wherein said vacuum system is connected to withdraw noncondensibles from said vapor chamber between the tube sheets and also to remove evolved gas and uncondensed vapor from above said feedwater collection chamber.

* * * * *